_United States Patent Office_

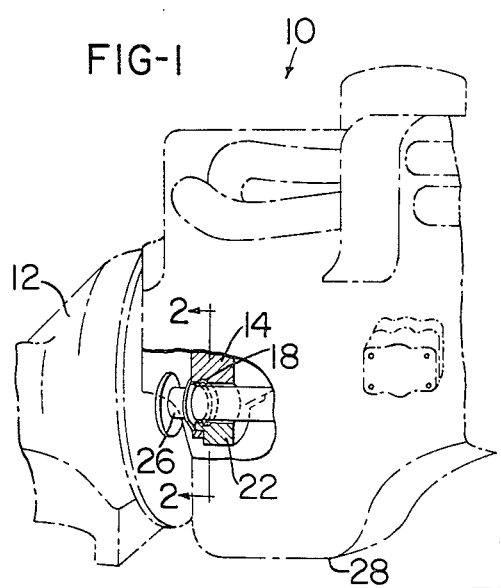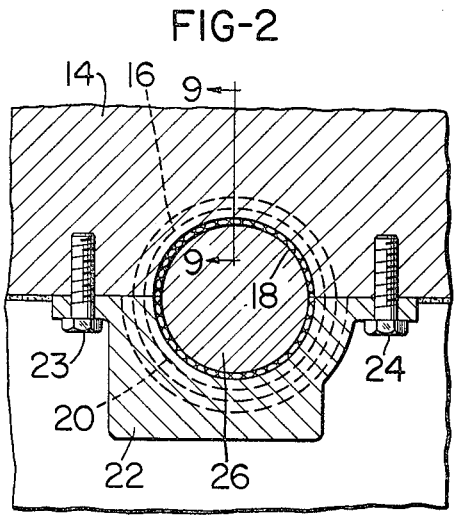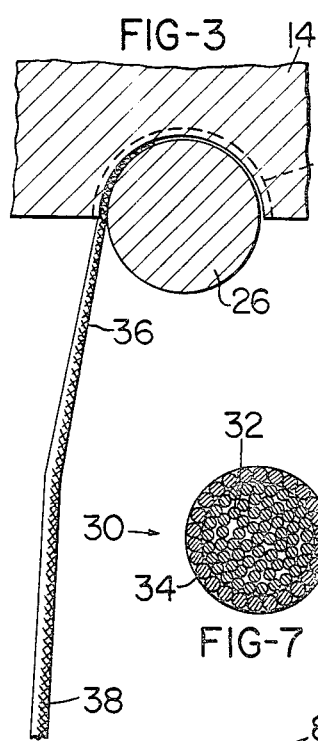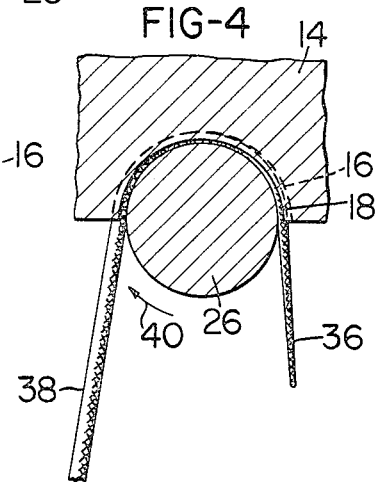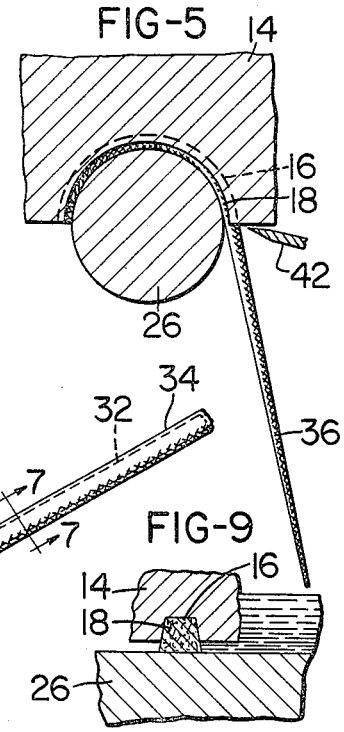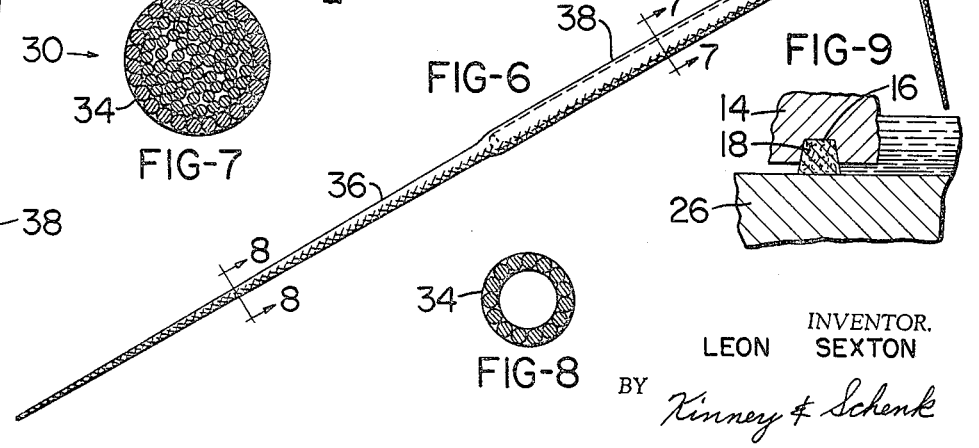

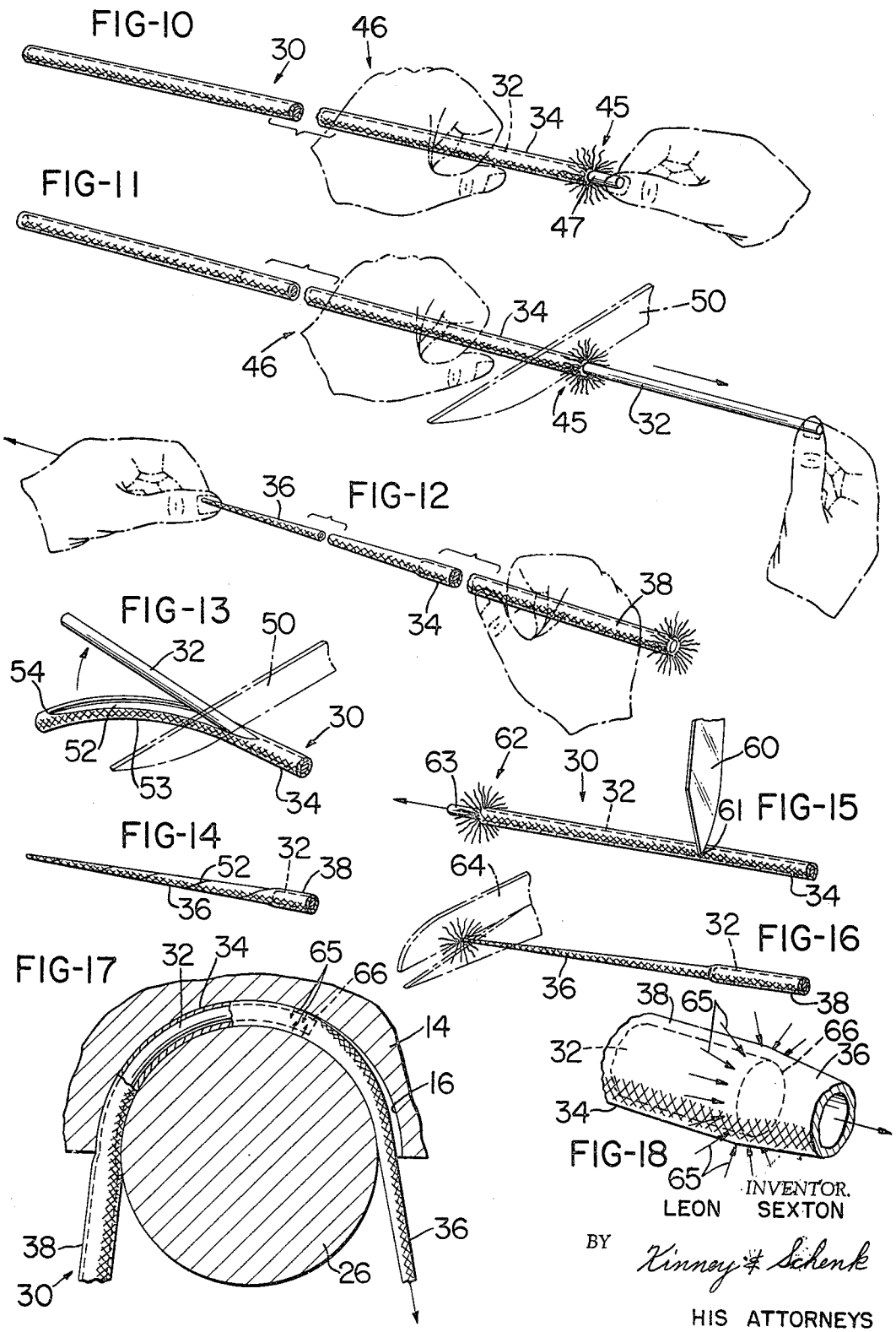

3,490,131
Patented Jan. 20, 1970

3,490,131
METHOD OF MAKING AND INSTALLING A SEAL
Leon Sexton, P.O. Box 78, Huntsville, Tenn. 37756
Continuation-in-part of application Ser. No. 330,368, Dec. 13, 1963. This application June 22, 1967, Ser. No. 648,125
Int. Cl. B23p 7/00
U.S. Cl. 29—401                     6 Claims

ABSTRACT OF THE DISCLOSURE

This disclosure relates to seal means for the upper rear section of the crankshaft bearing of an internal combustion engine of the type used in an automobile and to an improved method of installing such seal means which is of known construction and proven reliable performance rapidly and economically with the crankshaft in position and without requiring special tools or fixtures and without the likelihood of scratching or otherwise damaging the crankshaft or adjacent surface means.

---

This application is a continuation-in-part of application Ser. No. 330,368 filed Dec. 13, 1963, now abandoned.

This invention relates to means and method for installing seals and more particularly to installing the upper section or part of the crankshaft rear oil seal, which is also sometimes referred to as the rear main bearing oil seal, of internal combustion engines in automobiles. The upper rear main bearing is provided with a very narrow groove into which an oil seal is placed and it is particularly difficult to place the oil seal in said small groove due to the inaccessibility of this groove and because of the greater diameter of the seal in its original condition than the groove into which it must be placed around the crankshaft. Oil seals are normally constructed of a strand of graphite-impregnated packing which prior to placement in the oil seal should have a cross sectional area somewhat greater than the groove. The problem of inserting a new oil seal is further compounded by the fact that the crankshaft remains in place and it is a major feat to pull the crankshaft out of a modern automobile in order to expose the general area of the upper rear main bearing oil seal groove. Accordingly, it is an object of the present invention to provide a method and means whereby the oil seal may be quickly and easily installed into the upper groove for the crankshaft rear oil seal.

In the past devices have been provided which employ some means for engaging a seal. Such devices would first be inserted through the seal groove and then secured to one end of the packing strand and thereafter pulled through the groove so as to thread the oil seal into position. However, this type of device was found to be impractical and difficult to use because the device itself caused the effective cross-sectional area of the sealing strand to be enlarged and increased the difficulty of inserting the strand into the groove. In addition, the possibility of scratching the crankshaft surface was very great due to the tight squeeze and enlarged cross-sectional area. Also, such previous devices often comprise portions made of metal such as metal wire, for example, which also tend to scratch the crankshaft and adjacent surface means including along the seal receiving groove. The tendency to scratch is much greater at the point of attachment of a metal wire with the terminal end of an elongated seal member because it is practically impossible to firmly attach such wire in position in a smooth manner. Any scratch or roughness on the crankshaft could have the effect of later destroying the seal due to rotation of the crankshaft during the running of the engine. It is very important not to scratch or score the outer surface of the crankshaft. Therefore, another object of the present invention is to provide means and method whereby an oil seal may be installed in the upper groove for the crankshaft rear oil seal without scratching the crankshaft.

It has also previously been proposed to provide an oil seal for automotive crankshafts which is manufactured in one continuous solid piece and having a narrow leading end portion and a thicker trailing portion formed integrally therewith. The thicker portion of such a seal being of a size closely conforming to the interior of the groove in which it is to be installed. However, such previously proposed seal is comparatively expensive to produce and must be manufactured in precise predetermined lengths. Further, such previously proposed seal is made of a solid and elongated resilient plastic body which is longitudinally and transversely deformable. However, it has been found that a seal made of a plastic or plastic-like material has a tendency to harden with heating and extended use and has a tendency to leak excessively after hardening which is very undesirable. Therefore, another object of the present invention is to provide a seal of known acceptable performance, which does not have to be manufactured in an expensive and special way, which does not tend to harden and leak after extended use, and which may be installed in position simply and economically.

It has also been previously proposed to provide a special fixture with a substantially funnel shaped lead-in to enable insertion of an oil seal within an associated groove. Obviously, the provision and installation in position of any special fixture is expensive and time consuming. Therefore, another object of the present invention is to provide a method and means of installing an oil seal in position in an efficient manner without requiring special fixtures.

Another object of the present invention is to avoid leaks in the crankshaft rear oil seal which leaks in time accumulate a surplus of oil under the fly wheel and may cause the oil to be splashed upon the clutch, which in turn causes the clutch to slip and often requires replacement.

It is a further object of the present invention to provide means and method whereby an oil seal can be inserted within the upper groove for the crankshaft rear oil seal without first removing the crankshaft. In the past it was necessary to remove the crankshaft in an attempt to expose the general area of the upper groove for the crankshaft rear oil seal. With the present invention however, it is possible merely by removing the oil pan and dropping the rear bearing cap and retainer for the lower part of the crankshaft rear oil seal (some engines have the lower part of the seal installed in a groove in the rear main bearing cap, others have it installed in a groove in a retainer and some have it installed in a groove in the oil pan) to expose the upper seal groove, and thereafter easily insert the new seal. Thus, another object of the present invention is to provide means and method for inserting the upper part or section of the crankshaft rear oil seal in an automobile by merely dropping the oil pan and removing the lower bearing cap or retainer.

Another object of the present invention is to provide means and method wherby oil seals can be quickly and inexpensively installed in an automobile and further eliminate the danger of running low on oil due to leakage and further reduce the operator's operational expense.

Another object of the present invention is to provide an improved rope-like seal for use between two members wherein such seal has a cover disposed over a central core and wherein such seal has an elongated section of the central core removed from one end portion thereof to provide a reduced diameter portion for such seal formed of only the cover whereby such reduced diameter portion is adapted to be easily threaded between the two members.

Another object of the present invention is to provide an improved elongated seal for use between two members wherein such seal has a woven cover disposed over a central core and is adapted to have an elongated section of the central core removed from one end portion thereof and upon removing said elongated section of the central core and pulling on the outer cover the construction of such seal is such that the core therebeneath is continuously radially compressed and hence continuously reduced in cross-sectional area as it is pulled through the two members to thereby provide a more effective threading of such seal between the two members.

Another feature of this invention is to provide an improved method for reducing the cross-sectional area of one end portion of an elongated seal which is adapted to be used between a pair of members to enable easy threading of such seal between such members.

Another feature of this invention is to provide an improved method of removing an elongated central portion of a rope-like seal adapted to be used between a pair of members wherein such seal has an outer cover disposed over a central core and wherein such elongated central portion can be removed simply and efficiently to enable forming a tapering reduced diameter portion which enables easy installation between such members.

Another object of the present invention is to provide means and method for installing oil seals characterized by their simplicity and low manufacturing cost. Other features of this invention reside in the arrangement and design of the parts for carrying out their appropriate functions.

Further objects of the present invention and practical advantages will be referred to and are evident from the following description of the invention as illustrated in the accompanying drawing as follows:

FIGURE 1 is a perspective view, with parts cut away, of an automobile motor and transmission in the area of the upper part or section of the crankshaft rear oil seal which is also sometimes referred to as the upper rear main bearing oil seal.

FIGURE 2 is an enlarged cross-sectional view taken along a plane of line 2—2 of FIGURE 1.

FIGURES 3–5 are views showing the progressive steps of inserting an oil seal in the upper groove for the crankshaft rear oil seal or upper rear main bearing seal groove in accordance with the teachings of the present invention.

FIGURE 6 shows the seal of FIGURES 3–5 stretched in a rectilinear path to illustrate the manner in which the end portion which has the central core removed tapers to a substantially reduced cross-sectional aera.

FIGURE 7 is an enlarged cross-sectional view taken along the plane of line 7—7 of FIGURE 6.

FIGURE 8 is an enlarged cross-sectional view taken along the plane of line 8—8 of FIGURE 6.

FIGURE 9 is a fragmentary cross-sectional view taken along the plane of line 9—9 of FIGURE 2.

FIGURES 10 through 12 illustrate a series of steps comprising one exemplary method of removing a length of a central core from within the outer cover of an elongated oil seal wherein an end portion of the outer cover is peeled back, an elongated section or portion of the central core is pulled out from within the cover and cut away, and then the opposite end of the seal is stretched out (as seen in FIGURE 12) to define a seal construction substantially identical to the seal construction shown in FIGURE 6.

FIGURES 13 and 14 illustrate another exemplary method of removing the central core from within the outer cover wherein the outer cover is slit along a predetermined length thereof, a portion of the central core is then pulled out and severed, and the remaining seal is then stretched out and slightly twisted to again define a seal construction substantially identical to the seal construction shown in FIGURE 6.

FIGURES 15 and 16 illustrate another exemplary method of removing the central core from within a woven outer cover of an exemplary oil seal wherein individual strands of the woven outer cover are moved aside with a suitable sharp instrument for access by a cutting edge to enable severing of the central core inwardly of one end thereof yet without damaging the outer cover and then pulling out the severed end portion of the core and stretching the remaining seal construction to again define a seal construction substantially identical to the seal construction illustrated in FIGURE 6.

FIGURE 17 is an enlarged cross-sectional view particularly highlighting the manner in which upon pulling the outer cover of the seal construction shown in FIGURE 6 a radial compression of the inner core is provided to effectively continuously exert forces tending to reduce the diameter at the leading edge of the seal as it is pulled through its associated groove means and thereby enable an easier pulling of the seal in position between a pair of members.

FIGURE 18 is an enlarged perspective view presented to highlight the manner in which an axial pull on the outer sleeve-like woven cover of a sealing strand produces radially inwardly directed compressive forces against the central core.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are terms of description and not of limitation, as the scope of the present invention is denoted by the appended claims.

Referring now to FIGURE 1 of the drawing, an internal combustion engine 10 is shown coupled with a transmission 12. In automobile construction it is well known to provide a rear engine oil seal to retain the oil within the engine and prevent it from escaping from the engine along the crankshaft. Said seal being provided around the crankshaft in the block of the engine. As seen in FIGURES 1–5, the block 14 is provided with a semi-circular groove 16 in the area of the main rear bearing for the purpose of receiving an oil seal 18. The lower half of the oil seal is placed in a groove 20 provided in a lower main bearing oil cap 22 or oil seal retainer which is secured to the block 14 by a plurality of bolts 23 and 24. Thus, it is seen that a seal is provided which completely surrounds a crankshaft 26 as seen in FIGURE 2.

When replacing the oil seal around the crankshaft, it is first necessary to remove the oil pan 28 from the motor which exposes the lower main bearing oil cap 22 or oil seal retainer. It is a simple matter thereafter to remove the lower main bearing oil cap or oil seal retainer by first removing the bolts 23 and 24, as seen in FIGURE 2. Little or no trouble is experienced in placing a suitable oil seal within the semi-annular groove 20 provided in the lower main bearing oil cap or oil seal retainer 22. However, a great deal of difficulty is experienced when trying to insert an oil seal in the upper seal groove 16, due to the fact that the crankshaft is still in place and provides only a very small area or groove within which to work. The operation could be simplified by removal of the crankshaft; however, the difficulty of removing the crankshaft on a modern automobile is so great that the time and expense involved makes the operation prohibitive. In the past attempts have been made to devise means for inserting an oil seal strand in the upper seal groove 16 with the crankshaft in place. Such attempts have usually been based upon some type of grasping means which was first inserted through the upper oil seal groove and then secured to one end of the sealing strand. Thereafter, an attempt was made to pull the strand through the groove. However, since the cross-sectional area of the strand initially was greater than the cross-sectional area of the receiving oil groove the amount of frictional resistance on the sealing strand increased as the strand progressed into the groove. This resistance usually increased to such a high degree that when the strand was no more than half way through the groove the pulling device would become disengaged from the strand. Also, the pulling device itself often scratched the crankshaft and adjoining surface means which, as previously mentioned, is very undesirable.

The means by which the present invention accomplishes the insertion of a sealing strand within the very narrow confines of the upper seal groove consists simply of providing a conventional strand of graphite-impregnated packing having sufficient thickness to completely fill the upper seal groove and having integrally formed therewith a reduced end portion whose effective cross-sectional area is substantially less than that of the main body of the sealing strand and the seal groove. As seen in FIGURES 6–8, a rope-like oil seal packing 30 normally consists of a central core 32 of packing and an outer woven cover 34. By removal of a desired length of the central core adjacent one end portion of a length of the sealing strand it becomes possible to reduce the effective cross-sectional area of the strand over this length. Such removal of the desired length of central core from within its cover may be achieved by any of a number of different procedures or methods. Three exemplary present preferred methods will be presented and described in detail later in this disclosure.

As seen in FIGURE 6, the left end portion 36 of the sealing strand has had the core portion removed therefrom (see also FIGURE 8) while the right end portion 38 of the strand still contains the core portion 32. The outer cover has not been adversely affected and is substantially continuous throughout the length of the strand. By removal of the core from one end of the strand over a length at least slightly greater than the circumferential length of the upper oil seal groove 16 and preferably three to six inches greater in length than said groove, the strand may be threaded into the upper oil seal groove by inserting the end of the strand which has had the core removed, into the groove as seen in FIGURE 3 and thereafter passing the reduced strand end through the groove which is readily done until it egresses from the other end of the groove, as seen in FIGURE 4. The outer woven cover defining end portion 36 of the sealing strand 30 has sufficient rigidity that it is easily threaded through upper oil seal groove 16 in the manner shown in FIGURES 3 and 4 and it is impossible to scratch or damage the crankshaft or adjacent surface means because of the construction of sealing strand 30.

After a sufficient length of sealing strand has egressed through the end of the oil seal groove, as seen in FIGURE 4, so that a good hold may be had upon the end of the strand, the projecting end of the strand is grasped by any suitable means and may even be grasped within the hand of the operator. Then by simultaneously pulling on this free end of the sealing strand while rotating the crankshaft in the direction of the arrow 40 (to assist the further threading operation) the remainder of the sealing strand, mainly that portion containing the full diameter core is threaded into the upper oil seal groove 16 and forms a very tight perfect seal therein. Rotation of the crankshaft can be readily accomplished by installing two wires to the starter and by placing a switch within reach of the man who is installing the seal, he may connect the starter to the battery by means of the switch and cause the starter to turn the engine over so that the crankshaft will rotate. It will be understood, however, with the present invention it is not necessary to rotate the crankshaft in order to install the seal. However, rotation of the crankshaft does make the operation easier. When the strand reaches the position, as seen in FIGURE 5, wherein the left end thereof is in approximate alignment with the left opening of the oil seal groove, the threading operation is discontinued. Thereafter, a sharp blade 42 may be used to cut off the excess portion of both ends of the oil seal, as seen in FIGURE 5, to provide ends on the seal which are flush with the under surface of the block 14. Having clean cut flush ends on the seal is desirable particularly when the lower cap is reinstalled to provide a very precise tight fit completely around the outer surface of the crankshaft.

Thereafter, the lower oil seal cap or retainer having also been provided with a suitable seal is replaced into the position as shown in FIGURE 2 wherein the ends of the two halves of the seal abut each other and form a perfect seal around the entire circumference of the crankshaft. By this means and method no sharp instruments have been used in connection with the insertion of the sealing strand, thus, there is no possibility of scratching the crankshaft or in any way deforming the oil seal strand itself.

It will be understood, of course, that not all oil seal strands are constructed in the same manner, however, it is the concept of the present invention to provide an oil seal strand wherein one end thereof has been reduced in its effective cross-sectional area and wherein that end is integral with the remaining portion which has maintained its full cross-sectional area to form a perfect seal within the appropriate oil seal groove so that upon insertion of the reduced end into the oil seal groove the remaining end thereof may be readily threaded into the oil seal groove. Thereafter, the tapered portion 36 of the sealing strand 30 threaded through groove 16 is cut away so as to leave only the full cross-sectional portion of the oil sealing strand in position within the groove 16, wherein it forms a perfect seal.

One exemplary method used in removing the central core 32 from within the outer woven cover 34 of the sealing strand 30 is illustrated in FIGURES 10–12. Thus, as seen in FIGURE 10 an end portion of the outer woven cover 34 is peeled back or pushed back as by a fingernail or any suitable instrument in the manner shown at 45 while suitably holding the main portion of the sealing strand 30 in the manner illustrated at 46. By peeling back a portion of the outer woven cover 34 as shown at 45 a terminal end portion 47 of the central core at one end of sealing strand 30 is exposed to enable easy grasping thereof.

Sealing strand 30 is held at 46 by holding cover 34 and portion 47 is grasped and pulled to thereby pull a desired section or portion of core 32 from within the outer woven cover 34 in the manner shown in FIGURE 11. The desired section of the central core is cut away using any suitable cutting means such as a knife 50, or the like.

The end portion from which a section of the central core 32 has been pulled out is then suitably grasped in the manner shown in FIGURE 12 and pulled to define a substantially reduced diameter tapering portion which is substantially identical to the corresponding portion of the sealing strand shown in FIGURE 6 and hence will be designated by the same numeral 36 and the main full diameter portion of FIGURE 12 is likewise designated by the numeral 38 in a corresponding manner.

The pulling action illustrated in FIGURE 12 accomplishes two main things. First of all because an elongated portion of the central core 32 has been pulled out, as the outer woven cover 34 is pulled it tends to stretch to a length substantially greater than the length of the central core 32 which was removed from within the woven cover 34. In addition, as the woven cover 34 is pulled it compresses the inner core substantially radially inwardly to also reduce its effective cross sectional area. It will be appreciated that by removing the central core in the manner described there is no damage to the remaining full diameter portion 38 of the sealing strand of FIGURE 12 and such remaining full diameter portion 38 is then pulled in position in the manner previously described in detail in connection with FIGURES 3–5 of the drawings.

Another exemplary method for removing a portion of the central core 32 from within the outer woven cover 34 is illustrated in FIGURES 13 and 14 of the drawings wherein as seen in FIGURE 13, an elongated cut 52 is made in one end portion of the sealing strand 30. The elongated cut 52 is made so that it commences adjacent a terminal end portion of the sealing strand 30 while being spaced apart from a terminal end thereof as shown at 54 in FIGURE 13. Having thus provided the cut 52 in the outer woven cover 34 in the manner illustrated, the sealing strand is flexed in an arc as shown at 53 to thereby expose and provide access to a portion of the central core 32 to enable severing of a desired length using a suitable knife again indicated by the numeral 50 as previously.

The end portion from which the elongated section of the core 32 is severed away in the manner illustrated in FIGURE 13 is then pulled and preferably simultaneously twisted to form the construction shown in FIGURE 14. Except for the cut 52 provided in the terminal end portion of outer woven cover 34 the resulting sealing strand shown in FIGURE 14 is substantially identical to the sealing strand presented in FIGURE 6 and therefore its tapered end portion will also be designated by the numeral 36 and its full diameter portion will be designated by the numeral 38 in a corresponding manner.

Although after providing elongated slit 52 in the outer woven cover 34 and removing the elongated portion of the central core 32 the woven cover beneath the slit is twisted, it will be appreciated that such twisting is not necessary and such twisting is merely accomplished to indicate that it can be achieved to enable easier insertion of elongated tapered portion 36 of the sealing strand of FIGURE 14 between the two associated members. Also, it is not required that slit 52 be spaced inwardly from the associated end of the sealing strand 30 as shown at 54 such inward spacing is only accomplished to enable easier threading of end portion 36 through groove 16.

Another exemplary method of removing an elongated portion of the central core 32 from within sealing strand 30 is illustrated in FIGURES 15 and 16 of the drawings. It will be appreciated that in some instances it may be very difficult to remove a desired section of the central core 32 in the manner presented in FIGURES 10–12 of the drawings. Also, it may be preferred not to slit outer cover 34. Under these conditions the method as presented in FIGURES 15 and 16 of the drawings is very effective.

Thus, as illustrated in FIGURE 15 a suitable sharp pointed instrument 60 may be used to spread apart a portion of the woven outer cover 34 as shown at 61 and at a location arranged inwardly from one end portion of the sealing strand 30 which corresponds to the length of central core 32 which is desired to be removed from within such sealing strand.

An adjacent end portion of the outer woven cover 34 is then peeled back as shown at 62 so as to expose a terminal end portion 63 of the inner core 32. Having thus exposed the central core 32 such central core is then severed using any suitable severing device such as a knife, or the like, and the end portion 63 of central core 32 is then grasped and pulled so that the central core 32 initially disposed between the opening provided at 61 and the terminal end at 62 can be pulled out.

The sealing strand 30 is then pulled and the frayed end is cut away, see FIGURE 16, using suitable cutting means such as scissors 64, or the like. The resulting construction shown in FIGURE 16 is substantially identical to the sealing construction or strand illustrated in FIGURE 6 and therefore its reduced diameter portion will again be designated by the numeral 36 and its full diameter portion will be designated by the numeral 38 in a corresponding manner.

It must be appreciated that the technique presented in FIGURES 3–5 may use any of the substantially identical sealing strands presented in FIGURES 6, 12, 14 and 16 of the drawings, to provide installation of a seal in a unique manner unknown heretofore. Referring to FIGURES 17 and 18 of the drawings, it will be seen that as the end portion 36 is pulled two things occur in simultaneous manner as previously mentioned.

First, the pulling action stretches and elongates end portion 36, because of the void left by removal of a selected portion of the central core 32, and the resulting construction is of reduced diameter and it has adequate rigidity to enable easy threading thereof. Further rigidity or stiffness may be imparted to end portion 36 by twisting such end portion 36, if desired, to enable easier threading through groove 16. The stretching of end portion 36 during threading also enables an operator installing the sealing strand in position to obtain a better grasp on end portion 36. As more force is applied more stretching occurs yet without impairing the structural integrity of the outer cover 34 or of the sealing strand in general.

Secondly, the pulling of end portion 36 produces effective compressive forces which are directed substantially radially inwardly toward the central core 32 and such radially inwardly directed forces are indicated by the arrows in FIGURES 17 and 18, a representative few of which have been designated by the numeral 65. The application of the radially inwardly directed forces due to pulling the outer cover 36 is especially effective in reducing the cross-sectional area of the terminal end portion of the inner core 32 indicated at 66 because of the abrupt change from the full diameter of the central core 32 to a vacancy which is created merely because a portion of the central core has been removed. Thus, at the point where there is likely to be maximum resistance as larger area portion 38 of sealing strand 30 is pulled through the groove 16 there is the greatest reduction in the cross-sectional area whereby the movement of sealing strand 30 is continuous and very smooth enabling easy installation of portion 38 of the sealing strand 30 in position.

By contrast, assume that the sealing strand is made as a single piece of continuous material, such as a plastic material, having a large cross-sectional area portion at one end and a leading end portion of reduced cross-sectional area for easy insertion through an associated groove. It will be appreciated that there will be a concentration of forces at the point where there is an abrupt change from the comparatively large cross-sectional area to the reduced cross-sectional area. As more force is applied to the reduced area portion the tendency is to stretch such reduced area portion while the larger cross-sectional area portion tends to continuously bind as it is pulled along the sealing groove. This is a decided contrast to the unique and simple manner in which the sealing strand of the present invention is pulled in position wherein the leading edge portion of the large diameter portion 38 is continuously kept at a comparatively smaller diameter and hence smaller cross-sectional area merely by the pulling action.

Thus, it is seen that a method has been provided by this invention which utilizes a sealing strand of proven reliable performance comprising a central core covered by a woven outer cover which after removal of an elongated end portion of the central core enables the corresponding end portion of the sealing strand from which the core was removed to be stretched without impairing its structural strength and easily inserted in position merely by the act of pulling the full diameter portion in position.

The technique of this invention used in making an elongated sealing member and installing such sealing member in position may be used in numerous applications; however, it is particularly useful in providing an oil seal for the rear main bearing of an automobile engine crankshaft. One example of an elongated rope-like sealing member for an automobile engine crankshaft which may be modified and installed by the unique technique of this invention is sold by the McCord Corporation of Detroit, Mich., and sold under the No. BS-53.

The method of this invention also enables stocking of rope-like sealing material essentially in roll form and for use in automobiles, for example, where the cross-sectional area of the grooves in which the sealing strand is to be installed are substantially identical whereby a predetermined length of the sealing material may be cut away from the supply roll, formed with a tapering end portion in the manner taught by this invention, and simply installed in position. This technique will reduce stocking problems, carrying of large inventories for different models, and enable the installation of a rear oil seal for the crankshaft of an automobile at minimum cost.

Thus, it is seen that the present invention greatly simplifies the problem of replacing the crankshaft rear oil seal of an automobile or any other seal of this type. The present invention can be practiced in an ordinary filling station without the requirement of a skilled mechanic since any service station attendant can be trained to perform this operation. In performing the operation, the attendant first drains the oil from the crankcase of the car, then drops the oil pan and thereafter removes the lower bearing portion retainer or cap so as to expose the upper oil seal bearing groove. This simple operation is in contrast to the old method wherein it was necessary to pull the engine out in order to remove the crankshaft. The removal of the motor and crankshaft is a major operation and requires the removal of the fan belts, generator, power steering belts, vibrator, damper, timing gears and timing chains, all main bearing caps, all connecting rods, the oil pump, etc., and this normally requires from one day to a day and a half. Furthermore, removal of the crankshaft disturbs the main bearings and all other oil seals including the front seal and increases the risk of getting dirt into all these parts during reassembly. Reassembly is usually more complicated and difficult than the disassembly and requires the services of a skilled mechanic.

The present operation can be performed in service stations because it does not require a skilled mechanic.

In view of the foregoing description, taken in conjunction with the accompanying drawing, it is believed that a clear understanding of the construction, operation and advantages of the present device will be quite apparent to those skilled in the art.

While present preferred embodiments of this invention, and methods of practicing the same, have been illustrated and described, it will be recognized that this invention may be otherwise variously embodied and practiced within the scope of the following claims.

What is claimed is:

1. A method for installing a seal between a first member and a second member comprising the steps of providing an elongated seal having a substantially uniform cross section throughout its length and having an outer covering disposed over a core, removing part of said core from one end portion of said seal to provide a portion of said seal that is adapted to have a reduced cross section provided by only said cover, inserting said reduced portion of said seal between said members, and drawing the unreduced portion of said seal between said members by pulling said reduced portion from between said members and thus move said unreduced portion between said members to provide a seal therebetween, said pulling action causing said cover to exert compressive forces acting radially inwardly against a portion of said core disposed beneath said unreduced portion to reduce the cross sectional area thereof and enable easier insertion between said members.

2. A method as set forth in claim 1 further comprising the step of cutting off both ends of said seal adjacent said members.

3. A method as set forth in claim 1 further comprising the step of moving one of said members in the same direction that said seal is being pulled to facilitate the drawing of the unreduced portion of said seal between said members.

4. A method as set forth in claim 1 in which said step of removing part of said core comprises the steps of peeling back a length of said cover adjacent the end opposite said one end portion to expose an associated terminal end portion of said core, withdrawing part of said core from within said cover by grasping and pulling said terminal end portion while holding said cover against axial movement to provide said one end portion of said seal defined by only said cover, and cutting said part of said core from the remainder of said seal, said cover at said one end portion defining an elongated section having said reduced cross section upon pulling thereof and said elongated section being easier to grasp and pull during said drawing step.

5. A method as set forth in claim 1 in which said step of removing part of said core comprises the steps of providing an elongated rectilinear cut in said cover adjacent said one end portion, flexing said one end portion in an arcuate path causing said core to move away from said cover, and withdrawing and cutting away that part of said core arranged substantially beneath said cut to provide said one end portion of said seal defined by only said cover, said cover at said one end portion defining an elongated section having said reduced cross section upon pulling thereof and said elongated section being easier to grasp and pull during said drawing step.

6. A method as set forth in claim 1 in which said step of removing part of said core comprises the steps of spreading apart a portion of said cover adjacent said one end portion to define an opening therein while keeping the structural integrity of said cover intact, and withdrawing and cutting away that part of said core arranged outwardly of said opening in said one end portion to provide said one end portion of said seal defined by only said cover, said cover at said one end portion defining an elongated section having said reduced cross section upon pulling thereof and said elongated section being easier to grasp and pull during said drawing step.

References Cited

UNITED STATES PATENTS

| | | | |
|---|---|---|---|
| 1,513,548 | 10/1924 | Hall | 277—229 X |
| 2,621,398 | 12/1952 | Simmons | 29—433 X |
| 2,780,120 | 2/1957 | McCarley. | |
| 2,945,407 | 7/1960 | Beltrani. | |
| 3,029,503 | 4/1962 | Meyer | 29—401 X |
| 3,084,423 | 4/1963 | Fullerton | 29—401 X |
| 3,112,112 | 11/1963 | Wright. | |

CHARLIE T. MOON, Primary Examiner

U.S. Cl. X.R.

29—426, 451; 277—1, 10, 229